United States Patent
Baalmann et al.

(10) Patent No.: US 6,311,804 B1
(45) Date of Patent: Nov. 6, 2001

(54) SYSTEM FOR ELECTRICALLY DETECTING PISTON POSITIONS IN A HYDRAULIC SYSTEM

(75) Inventors: Joseph G. Baalmann; Robert J. McMullen, both of Kansas City; Roger D. Hanaway, Blue Springs, all of MO (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 09/553,812

(22) Filed: Apr. 21, 2000

Related U.S. Application Data

(63) Continuation of application No. 08/852,235, filed on May 6, 1997.

(51) Int. Cl.[7] .................................................. F16D 66/00
(52) U.S. Cl. ................................ 188/1.11 L; 188/1.11 E
(58) Field of Search ........................ 188/1.11 L, 1.11 E, 188/1.11 W

(56) References Cited

U.S. PATENT DOCUMENTS

| | | | | |
|---|---|---|---|---|
| 2,914,630 | * | 11/1959 | Ralston | 188/1.11 L |
| 3,776,329 | * | 12/1973 | Hope et al. | 188/1.11 L |
| 4,642,603 | * | 2/1987 | Martinez, Jr. | 188/1.11 L |
| 4,883,150 | * | 11/1989 | Arai | 188/1.11 E |
| 5,358,075 | * | 10/1994 | Jarzombek | 188/1.11 L |
| 5,967,266 | * | 10/1999 | Carnegie | 188/1.11 L |

FOREIGN PATENT DOCUMENTS

| | | | | |
|---|---|---|---|---|
| 466604 | * | 1/1992 | (EP) | 188/1.11 L |
| 1512003 | * | 5/1978 | (GB) | 188/1.11 L |

* cited by examiner

*Primary Examiner*—Matthew C. Graham
(74) *Attorney, Agent, or Firm*—St. Onge Steward Johnston & Reens LLC

(57) ABSTRACT

A system for electrically detecting different positions of a movable piston within a piston housing of a hydraulic system is provided. The system includes at least two electrically conductive pads mounted on the piston housing at different locations along the path of movement of the piston, an electrically conductive segment mounted on the piston housing along the path of movement of the piston adjacent the conductive pads, and an electrical coupler, such as a spring-loaded conductor, attached for movement with the piston to provide an electrical connection between each conductive pad and the conductive segment as the piston moves along within the piston housing. The system also includes an electronic control unit, which may be a microprocessor, coupled to each conductive pad and the conductive segment to detect electrical connection between each conductive pad and the conductive segment. Each electrical connection corresponds to a specific position of the piston.

10 Claims, 4 Drawing Sheets

SYSTEM FOR ELECTRICALLY DETECTING PISTON POSITIONS IN A HYDRAULIC SYSTEM

This application is filed under 37 CFR §1.53(b) and is a continuation of co-pending U.S. application Ser. No. 08/852,235 for a "System For Electrically Detecting Piston Positions In A Hydraulic System," filed May 6, 1997.

FIELD OF THE INVENTION

The invention relates to a system for electrically detecting piston positions in a hydraulic system, and more specifically to a system for electrically detecting piston positions in a hydraulic brake system for improved control of response to changes within the brake system.

BACKGROUND OF THE INVENTION

It is known to use pressure switch assemblies actuatable in response to fluid pressure for detecting a predetermined condition within a hydraulic system. For example, U.S. Pat. No. 4,454,393 discloses an electronic warning device for signaling an error condition in a hydraulic system employing three pistons which are spatially arranged so that when predetermined spatial relations are established therebetween in response to fluid pressure, electronic signals are issued by switching elements to indicate an error condition.

It is also known to employ stroke switch assemblies for detecting a predetermined condition within a brake system. For example, U.S. Pat. No. 5,388,894 discloses a brake fluid distribution system for use in antilocking brake systems (ABS) which employs a switch in communication with low pressure accumulator for activating pumps that evacuate the brake fluid from the low pressure accumulator. The accumulator has an indicator piston which indicates the amount of brake fluid within the accumulator. When the amount of brake fluid within the accumulator reaches a preselected level, the indicator piston causes a switch piston to turn on the switch for activating pumps that evacuate the brake fluid.

Like the >894 patent, U.S. Pat. No. 4,799,048 discloses an accumulator disposed in fluid supply tube system of a hydraulically operated device (e.g., automotive hydraulic anti-skid braking system) which employs a switch mechanism, e.g., a reed switch, to indicate when there is excessive fluid pressure in the accumulator.

The prior art pressure switch or stroke switch assemblies in hydraulic systems, especially hydraulic brake systems, pose a significant disadvantage because they do not indicate different positions of the brake-applying/brake-releasing piston. This drawback will be further illustrated with respect to spring apply, hydraulic release (SAHR) brake systems for vehicles. SAHR brakes, as known, generally operate in the following manner: a spring normally biases a piston which applies the brakes; normal operation of a brake release actuator causes pressurized hydraulic fluid to move the piston against spring bias to release the brakes.

If the movement of the piston to release the brakes in the SAHR brake system is partially blocked so that brakes are not fully released, the prior art pressure switch assemblies may still indicate that the brakes are fully released if the amount of hydraulic fluid pressure measured within the system exceeds a certain preset threshold. This may result in significant damage to the components of the brake system if an operator of the vehicle operates the vehicle believing that the brakes are fully released. Also, stroke switch assemblies, such as used in the >048 and >894 patents, are not very useful for controlling brake operations since the stroke switch assemblies only detect one position of the piston.

Therefore, what is desired is a system for a hydraulic system which will accurately, electrically indicate brake positions by detecting piston positions so that braking operations can be controlled to respond to changes in the hydraulic system.

SUMMARY OF THE INVENTION

Accordingly, it is one object of the invention to provide a system for electrically detecting piston positions of a moveable piston within a piston housing of a hydraulic system.

Another object of the invention is to provide a system for electrically detecting piston positions in a spring apply, hydraulic release (SAHR) brake system.

A further object of the invention is to provide a system for electrically detecting piston positions in a brake system which uses electrically conductive areas along the path of movement of the piston so that there are no moving wires.

Still another object of the invention is to provide a system for electrically detecting piston positions in a brake system which uses an electrical conductor attached to the piston so that there are no moving wires.

Yet another object of the invention is to provide a system for electrically detecting piston positions and for controlling a pump which governs the movement of the piston in accordance with the piston position detected.

A further object of the invention is to provide a system for electrically detecting piston positions by employing conductive areas along the path of movement of the piston having different resistance values.

These and other objects of the invention are achieved by a system for electrically detecting different positions of a movable piston within a piston housing of a hydraulic system. The system includes at least two electrically conductive pads mounted on the piston housing at different locations along the path of movement of the piston, an electrically conductive segment mounted on the piston housing along the path of movement of the piston adjacent the conductive pads, and an electrical coupler, such as a spring-loaded conductor, attached for movement with the piston to provide an electrical connection between each conductive pad and the conductive segment as the piston moves along within the piston housing. The system also includes an electronic control unit, which may be a microprocessor, coupled to each conductive pad and the conductive segment to detect electrical connection between each conductive pad and the conductive segment. Each electrical connection corresponds to a specific position of the piston. Depending upon the electrical connection detected, the electronic control unit causes the hydraulic system to respond in a predetermined manner (for example, causing a hydraulic pump of the hydraulic system to turn off or a solenoid valve to close so that no more hydraulic fluid enters the piston housing).

In another embodiment of the present invention, conductive pads having different preselected resistance values are used and the electronic control unit is designed to measure the different preselected resistance values.

The invention and its particular features and advantages will become more apparent from the following detailed description considered with reference to the accompanying drawings.

DETAILED DESCRIPTION OF THE INVENTION

Figure 1:
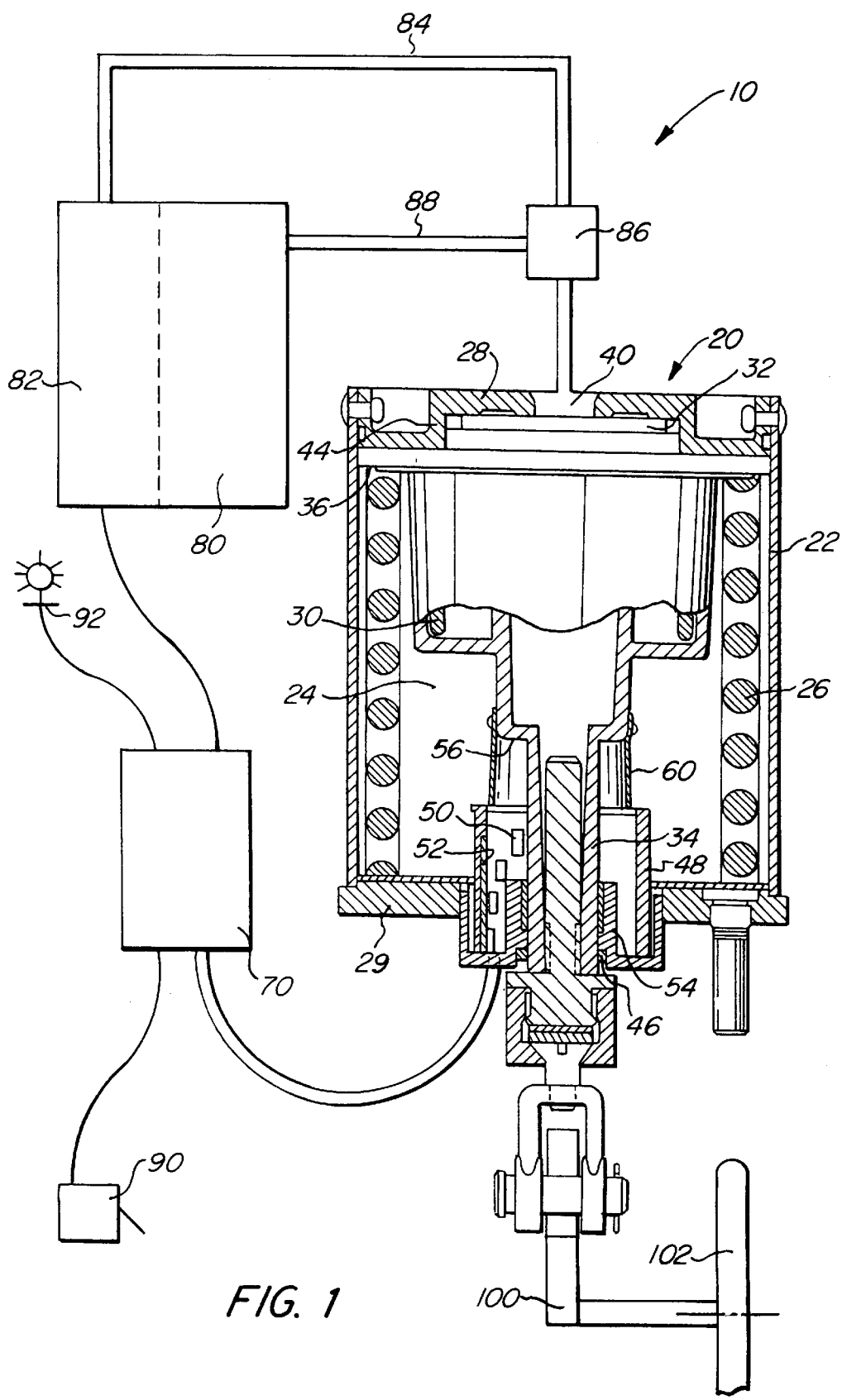
FIG. 1 is a schematic diagram showing a hydraulic system of the present invention.

FIG. 1 schematically shows a hydraulic system 10, which for purposes of illustration is a SAHR brake system. The hydraulic system 10 includes a piston assembly 20 of the present invention, which has a housing 22 with a first end 28 and a second end 29 defining a large-diameter bore 24. A resilient member 26, such as a compression coil spring, is disposed in the large-diameter bore 24. A piston 30 having a head portion 32 and a rod portion 34 is slidably disposed in the large-diameter bore 24 and has a ledge 36 on the head portion 32 abutting the resilient member 26 such that the resilient member 26 is confined between the ledge 36 and the second end 29 of the housing 22. In FIG. 1, the piston 30 is shown in brakes-applied position.

The first end 28 of the housing 22 has an intake/outtake port 40 through which hydraulic fluid enters or leaves the piston assembly 20 to apply or release a brake 100 on a wheel 102. The intake/outtake port 40 communicates with a hydraulic fluid reservoir 42 defined by a surrounding wall 44 affixed to the first end 28 which is sealingly, slidably engaged by the head portion 32 of the piston 30. The wall 44 and the reservoir 42 are better shown in FIG. 3. As the piston 30 slides within the housing 22, the sealing engagement of the piston head 32 with the inner surface of the wall 44 is maintained by sealing means (not shown), such as gaskets or a sealing ring.

The second end 29 of the housing 22 has an opening 46 which corresponds to the diameter of the rod portion 34 of the piston 30 so that the rod portion 34 can pass therethrough. Surrounding the opening 46 is a wall 48 affixed to the second end 29 which extends partially into the large-diameter bore 24. On the inner surface of the wall 48 are mounted electrically conductive pads 50 and an electrically conductive segment or strip 52 adjacent the pads 50 for detecting different positions of the piston 30, as described hereinbelow. Note that the inner surface of the wall 48 is made from a nonconductive material, such as plastic, so that each conductive pad 50 as well as the conductive segment 52 is electrically isolated.

Figure 3:
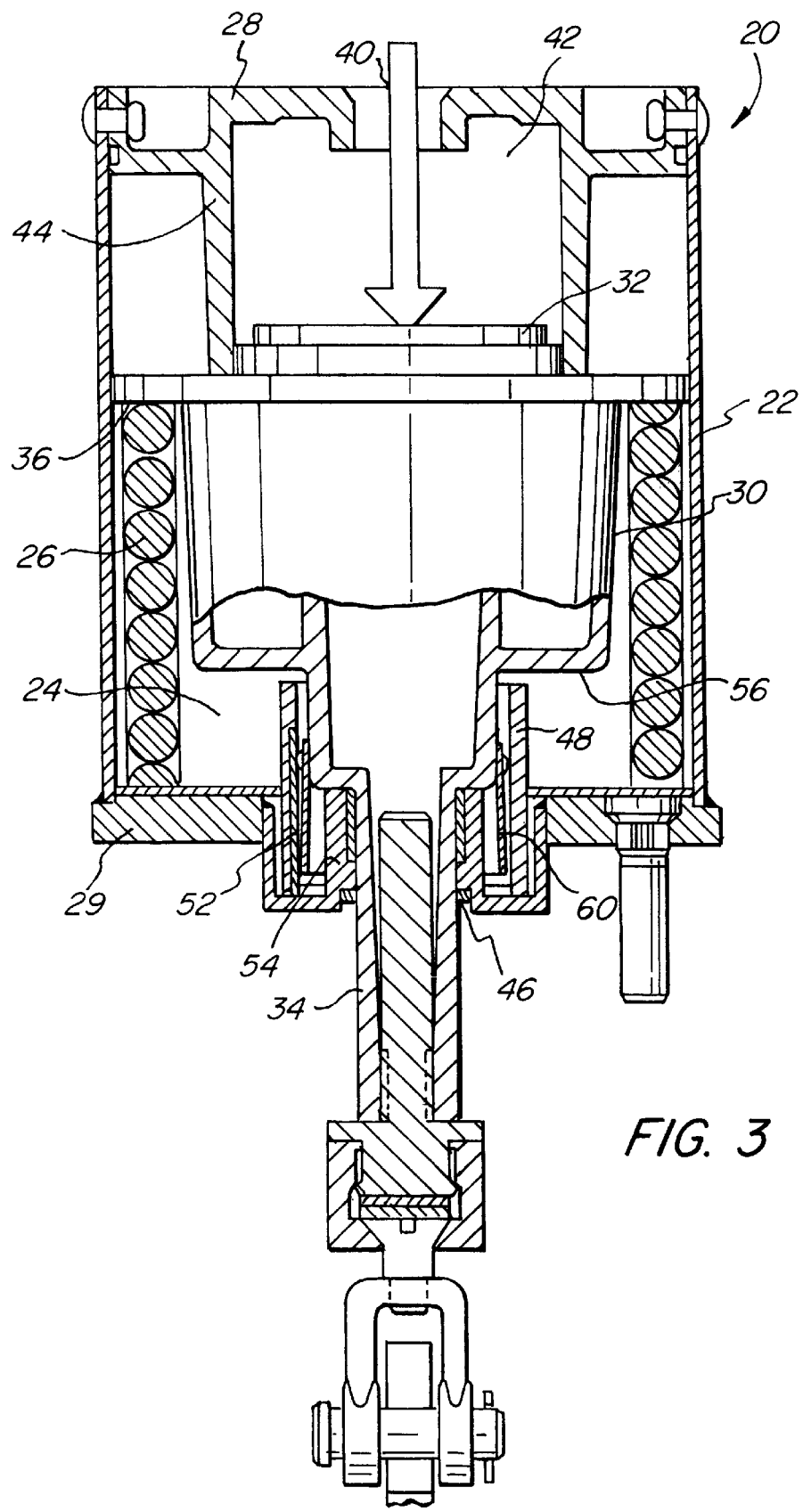
FIG. 3 is an enlarged view of the cross-sectional piston assembly of FIG. 1 showing the piston in the brakes-released position.

Immediately adjacent the opening 46 is a rim 54 for blocking an annular elbow 56 of the piston 30 located between the head portion 32 and the rod portion 34 so that the movement of the piston 30 in the direction of the second end 29 (brakes-released position) is limited thereto (see FIG. 3). Attached to the elbow 56 is an electrical coupler 60, such as a spring-loaded conductor, which, as the piston 30 moves within the housing 22, provides successive electrical connections between each conductive pad 50 and the conductive segment 52. Although the electrical coupler 60 is shown attached to the elbow 56, this is not necessary for successful operation of the invention. The coupler 60 just needs to be positioned so that as the piston 30 moves within the housing 22, successive electrical connections are provided between each conductive pad 50 and the conductive segment 52.

Figure 4:
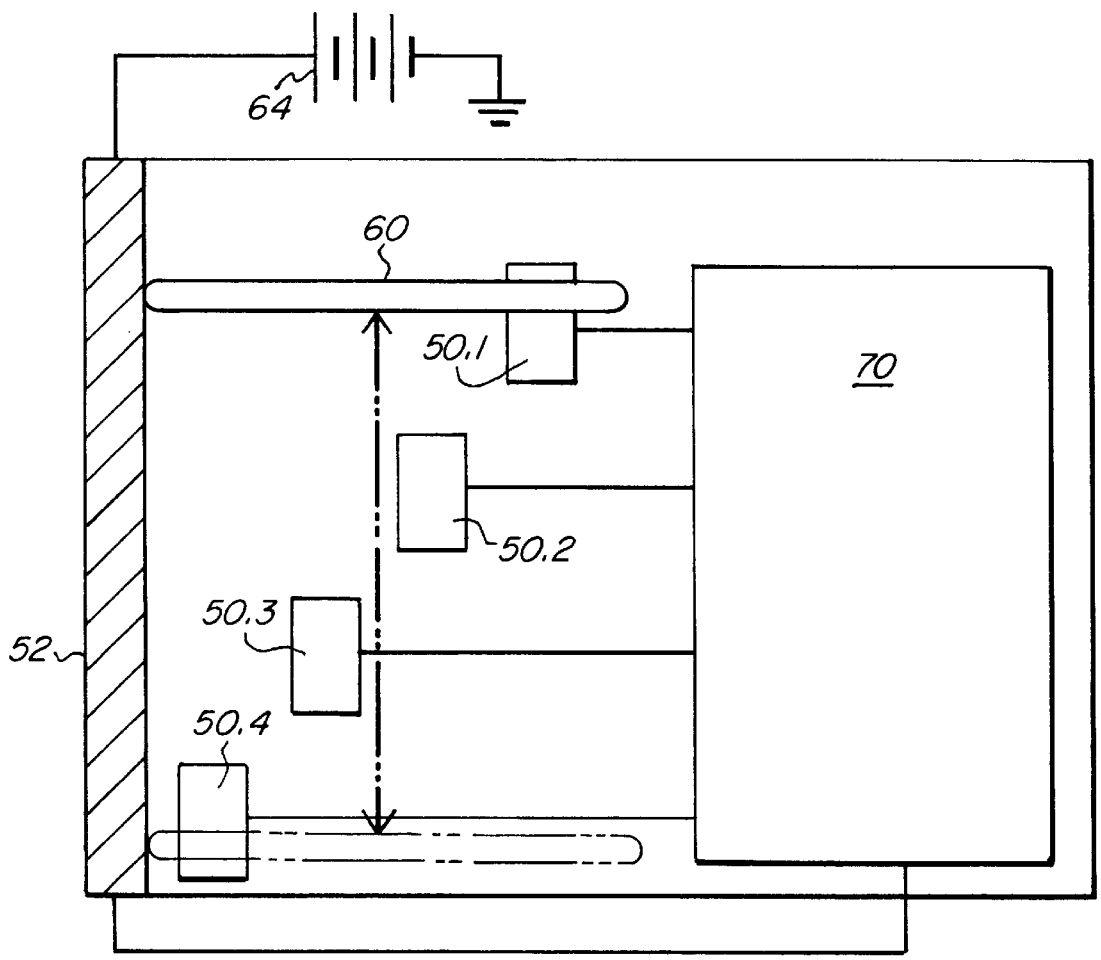
FIG. 4 illustrates movement of an electrical coupler which permits an electronic control unit of the present invention to determine the position of the piston in the piston assembly.

The conductive segment 52 is electrically coupled to a power source 64, such as a battery, causing the segment 52 to be charged with a positive voltage electrical signal. This is shown in FIG. 4. The conductive segment 52 is also electrically coupled to an electronic control unit 70, which may be a microprocessor. Each conductive pad 50 is electrically coupled to the electronic control unit 70 (in FIG. 1, only one pad 50 is shown electrically coupled to the electronic control unit 70 to simplify the illustration). As the electrical coupler 60 moves in conjunction with the piston 30 to form successive electrical connections between each conductive pad 50 and the charged conductive segment 52, each electrical connection is detected by the electronic control unit 70 since each electrical connection causes current to flow.

The hydraulic fluid to be introduced into or withdrawn from the piston assembly 20 is stored in a storage unit 80. A hydraulic pump 82 in fluid communication with the storage unit 80 is used to introduce or withdraw the hydraulic fluid via a hydraulic fluid fill/relieve line 84. An overpressure relief valve 86 located along the hydraulic fluid fill/relieve line 84 is in fluid communication with the storage unit 80 via an overpressure relief dump line 88. The function of the overpressure relief valve 86 is to permit hydraulic fluid which has been forced out of the hydraulic fluid reservoir 42 of the piston assembly 20 by excess pressure therein to return to the storage unit 80 via the overpressure relief dump line 88.

Excess pressure is extant in the piston assembly 20 when, for example, the temperature of the hydraulic fluid in the fluid reservoir 42 increases during continuous operation of a vehicle. Note that during operation of a vehicle, hydraulic fluid must be present in the piston assembly 20 to maintain the brakes in the released position. This temperature increase causes thermal expansion of the hydraulic fluid in the reservoir 42, which results in the excess pressure. The excess pressure causes some hydraulic fluid in the fluid reservoir 42 to be forced out through the intake/outtake port 40. The overpressure relief valve 86 allows the hydraulic fluid forced out through the intake/outtake port 40 to return to the storage unit 80.

Electrically coupled to the electronic control unit 70 are a switch 90 and the hydraulic pump 82 which permit an operator of the vehicle to apply or release the brakes 100 by actuating the switch 90. When the switch 90 is actuated, the electronic control unit 70 activates the pump 82 accordingly so that hydraulic fluid is introduced into or withdrawn from the fluid reservoir 42 of the piston assembly 20. A light source 92, such as a light-emitting diode, is electrically coupled to the electronic control unit 70 and is caused by the electronic control unit 70 to be activated when the piston 30 moves to a predetermined position within the housing 22. This light 92, which is to serve as a warning light, is described in more detail hereinbelow.

Figure 2:
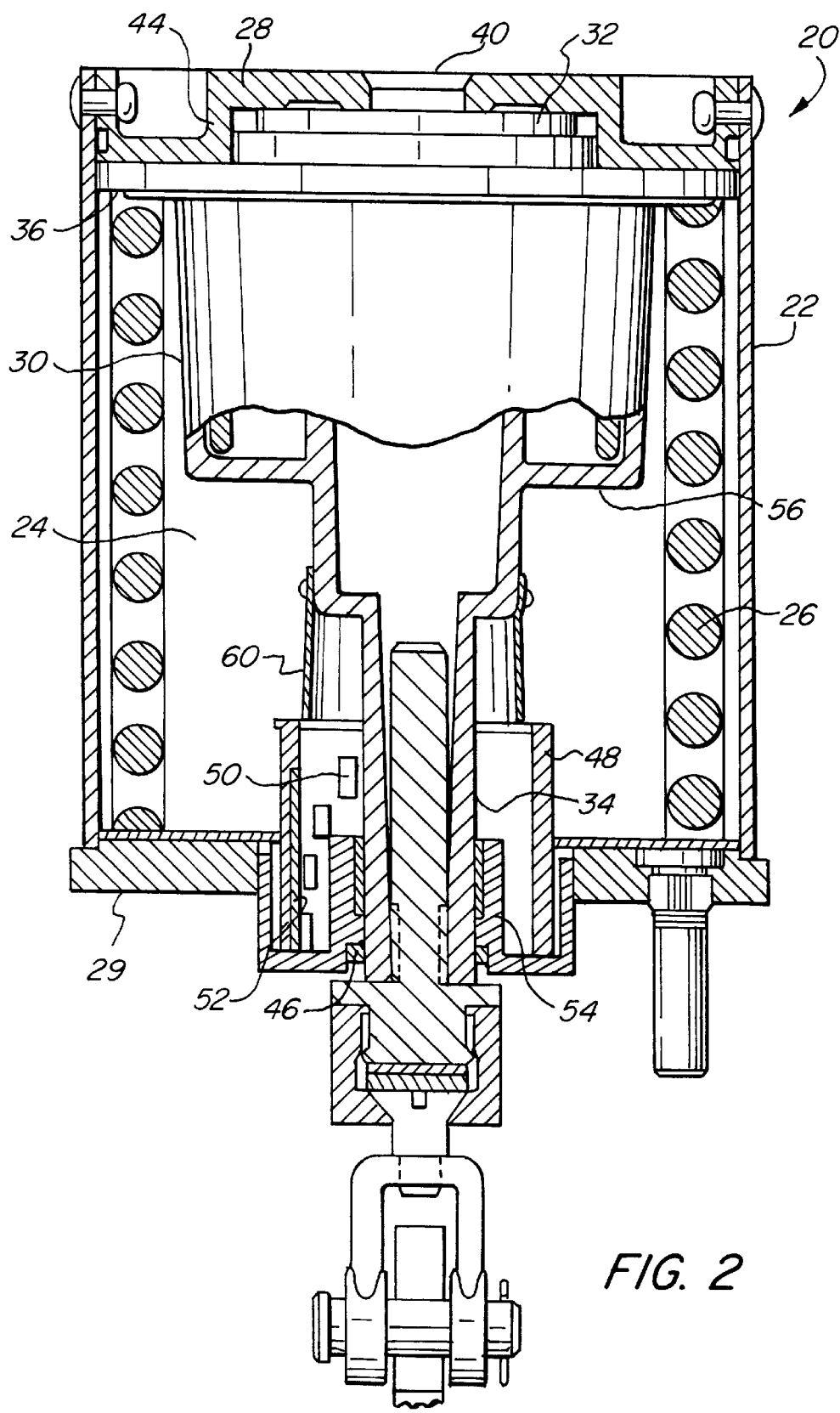
FIG. 2 is an enlarged view of the cross-sectional piston assembly of FIG. 1 showing the piston in the brakes-applied position.

FIGS. 2 and 3 are enlarged views of the cross-sectional piston assembly of FIG. 1. In FIG. 2, the piston 30 is in the brakes-applied position, while in FIG. 3, the piston 30 is in the brakes-released position. As the piston 30 moves from the brakes-applied position to the brakes-released position and vice versa, the corresponding movement of the electrical coupler 60 and the successive electrical connections formed thereby between each conductive pad 50 and the charged conductive segment 52 are illustrated in FIG. 4.

The electronic control unit 70 detects the position of the piston 30 in one embodiment by including a counter and memory (not shown) in the control unit 70 and by employing a sensor (not shown) connected to the piston 30 for sensing direction of movement of the piston 30. For each electrical connection detected by the control unit 70, the control unit 70 modifies the counter according to the previous count of the counter and the direction of movement of the piston 30. As an example, in FIG. 4, the counter can run from 0 to 4, with count 0 denoting brakes-applied position and count 4 denoting brakes-released position where the electrical coupler 60 electrically connects conductive pad 50.4 with the conductive segment 52. Counts 1–3 denote positions of the piston 30 corresponding to the electrical coupler 60 electrically connecting conductive pads 50.1, 50.2 and 50.3 with the conductive segment 52, respectively. Thus, if the electrical coupler 60 moves from conductive pad 50.3 to conductive pad 50.4, the count of the counter will change from 3 to 4.

The memory of the control unit 70 stores a predetermined function command for the control unit 70 corresponding to the count of the counter. For example, for FIG. 4, if the count of the counter has gone from 3 to 4, the predetermined function command in memory will cause the control unit 70 to automatically turn off the hydraulic pump 82 so that no more hydraulic fluid will be introduced into the piston assembly 20. However, if the count of the counter has gone from 2 to 3, the predetermined function command in memory will cause the control unit 70 to continue activating the hydraulic pump 82 so that more hydraulic fluid can be pumped into the piston assembly 20. Note that the mounting positions of the conductive pads 50.1–50.4 on the inner surface of the wall 48 (see FIGS. 1–3) are preselected so that appropriate function commands corresponding to these mounting positions can be stored in memory.

The greater the number of conductive pads 50 used in the system 10, the more responsive to changes the electronic control unit 70 can be. In another embodiment of the invention, the conductive pads can be provided with different preselected resistance values so that for each electrical connection formed between a conductive pad and the conductive segment 52 by the electrical coupler 60, there is a unique preselected resistance value associated therewith. The control unit in this embodiment is designed to measure the resistance value, and based upon the resistance value measured, respond according to the corresponding function command stored in memory. For this embodiment, it is also possible to replace the individual conductive pads with a conductive band having different resistance values thereal-ong.

The light 92 can be activated by the control unit 70 when the piston 30 is positioned at a predetermined position or positions within the housing 22. For example, the light 92 may be designated to indicate a condition where the brakes are not released, so that until the count of the counter is 4, the electronic control unit 70 activates the light source 92. Note that the light 92 can be used to indicate any other condition associated with the position of the piston 30 within the housing 22.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An electrical brake position detecting system in a hydraulically operated brake assembly, the brake position detecting system comprising:
   a piston housing extending along a longitudinal axis and having an inner wall made from an electrically non-conductive material;
   a piston displaceable axially reciprocally in the housing along a path;
   a plurality of axially spaced apart electro conductive pads fixedly mounted on the inner wall of the piston housing in predetermined locations;
   an electro conductive segment fixedly mounted on the inner wall within the piston housing and extending axially along the path, the pads and segment being spaced angularly apart;
   an electrical conductor mounted to the piston for movement therewith and extending radially between each of the pads and segment to establish successive electrical connection therebetween through the electrical conductor as it comes in direct contact with the segment and each of the pads during displacement of the piston; and
   a position detecting circuit coupled to each of the pads and the segment for detecting the electrical connections to generate a signal indicative of the positions of the piston corresponding to the predetermined locations of the pads along the path.

2. The brake position detecting system defined in claim 1 wherein the electrical conductor being spring loaded.

3. The brake position detecting system defined in claim 1, further comprising:
   a pump connected to the piston housing for controlling movement of the piston by adjusting fluid pressure on the piston; and
   a pump control circuit coupled to the position detecting circuit and the pump for providing control of the piston movement in response to the signal indicative of the position of the piston.

4. The brake position detecting system defined in claim 1, wherein the position detecting circuit and the pump control circuit comprise a microprocessor with a counter and memory, the counter modifying the count for each electrical connection detected between a conductive pad and the conductive segment, the microprocessor comparing the count of the counter with prestored count provisions in memory for determining the proper control of the pump.

5. The brake position detecting system defined in claim 1, further comprising a warning light coupled to the position detecting circuit, the warning light being activated when the piston moves to each detected position of the piston.

6. The brake position detecting system defined in claim 1, wherein electrically each of the electro conductive pads is defined by a different resistance value, the position detecting circuit including a resistance value measuring circuit coupled to each conductive pad and the conductive segment for measuring resistance value and for generating a signal indicative of the respective detected position of the piston based upon the resistance value measured upon establishing an electrical connection between each conductive pad and the conductive segment.

7. A method for electrically detecting at least two different positions of a piston movable along a path in a hydraulic system, comprising the steps of:
   providing a piston housing having an inner peripheral wall made form an electrically insulating material;
   mounting at least two electrically conductive pads on the inner peripheral wall at different positions along the path of movement of the piston;
   mounting an electrically conductive segment on the inner peripheral wall of the piston housing along the path of the piston in a spaced apart relationship with the conductive pads;
   attaching an electrical conductor for movement with the piston along the path to provide direct contacts between each of the pads and the segment, thereby establishing successive electrical connections therebetween through the electrical conductor as the piston moves along the path within the piston housing; and detecting electrical connection between each conductive pad and the conductive segment and generating a signal indicative of each of the two positions of the piston.

8. The method defined in claim 7, further comprising the step of controlling the piston movement in response to the piston position indicative signal.

9. An electrical brake position detecting system in a hydraulically operated brake assembly, the brake position detecting system comprising:

a piston housing extending along a longitudinal axis;

a piston displaceable axially reciprocally in the housing along a path and having a rod;

a bore formed within said housing and having an inner peripheral wall made from an electro-insulating material and spaced radially outwardly from the rod which traverses the bore;

a plurality of axially spaced apart electro conductive pads fixedly mounted on the inner peripheral wall of the bore, each of the electro conductive pads being mounted in a location corresponding to a respective predetermined position of the piston along the path in the piston housing, wherein one of the predetermined positions corresponds to brakes being engaged and another position corresponds to brakes being disengaged;

an electro conductive segment fixedly mounted within the bore on the inner peripheral wall and extending axially along the path, the pads and segment being spaced angularly apart;

an electrical conductor mounted on the rod for movement therewith and extending radially between the pads and segment to establish successive electrical connections through itself between each of the pads and the segment;

a position detecting circuit coupled to each conductive pad and the conductive segment for detecting the electrical connections between each conductive pad and the conductive segment and for generating a signal indicative of the detected predetermined position of the piston.

10. The electrical brake position detecting system defined in claim 9, further comprising a pump connected to the piston housing for controlling movement of the piston by adjusting fluid pressure on the piston;

a pump control circuit coupled to the position detecting circuit and the pump for providing control of the piston movement in response to the piston position indicative signal; and wherein the position detecting circuit and the pump control circuit comprise a microprocessor with a counter and memory, the counter modifying the count for each electrical connection detected between each conductive pad and the conductive segment contacted by the electrical connector, the microprocessor comparing the count of the counter with prestored count provisions in memory for determining the proper control of the pump.

* * * * *